UNITED STATES PATENT OFFICE.

HEINRICH AUGUST BERNTHSEN, OF MANNHEIM, AND PAUL JULIUS, OF LUDWIGSHAFEN, GERMANY, ASSIGNORS TO THE BADISCHE ANILIN AND SODA FABRIK, OF LUDWIGSHAFEN, GERMANY.

ORANGE DYE AND PROCESS OF MAKING SAME.

SPECIFICATION forming part of Letters Patent No. 631,610, dated August 22, 1899.

Application filed September 10, 1898. Serial No. 690,676. (Specimens.)

*To all whom it may concern:*

Be it known that we, HEINRICH AUGUST BERNTHSEN, a subject of the King of Prussia, German Emperor, residing at Mannheim, in the Grand Duchy of Baden, and PAUL JULIUS, a subject of the Emperor of Austria-Hungary, residing at Ludwigshafen-on-the-Rhine, in the Kingdom of Bavaria, Germany, have invented new and useful Improvements in the Manufacture of a New Substantive Coloring-Matter for Cotton, of which the following is a specification.

Our invention relates to the manufacture of a new substantive coloring-matter for cotton. The coloring-matter is chemically a mixed disazo dye obtained by the combination of the tetrazo compound of a diamido base—namely, benzidin or tolidin—with meta-phenylene-diamin-disulfo acid and then with nitro-meta-phenylene-diamin or nitro-meta-toluylene-diamin. Of course chemically different individuals result if tolidin be substituted for benzidin or one of the nitro-diamins mentioned for the other, but practically these bodies are equivalents and constitute one coloring-matter, the various brands differing but slightly and unessentially from one another.

We have discovered that meta-phenylene-diamin-disulfo acid behaves in a manner essentially different from meta-phenylene-diamin itself on treatment with tetrazo-diphenyl. While no process is known whereby a so-called "intermediate" product can be smoothly obtained by the union of one molecular proportion of tetrazo-diphenyl with one molecular proportion of meta-phenylene diamin, but a finished disazo dye incapable of further combination appears to result. Such an intermediate product can most readily be obtained when using meta-phenylene-diamin-disulfoacid. Even if this latter body be present in considerable excess the combination of the tetrazo compound with it does not proceed beyond the formation of the intermediate product. This intermediate compound is a brownish body difficultly soluble in water, and it is by the combination of this with a nitro-meta-diamin that the new dye is produced.

Our new coloring-matter is characterized by extraordinary coloring power and a peculiar fire or brilliance and possesses great fastness against the action of washing, acids, and light. It dyes unmordanted cotton.

The following example will serve to further illustrate the manner in which the invention can be carried into practical effect and our new dye obtained. The parts are by weight.

Prepare a solution of tetrazo-diphenyl in the well-known way, using about ninety-four parts of benzidin, three hundred and forty-five parts of hydrochloric acid containing about twenty-eight per cent. real HCl and seventy parts of sodium nitrite. Cool the tetrazo-solution with ice and render it alkaline with soda. To this run in an aqueous solution of one hundred and fifty-six parts of the sodium salt of meta-phenylene-diamin-disulfoacid. Stir for about six hours. After this period the formation of the red-brown intermediate product which is hardly at all soluble in water will usually be complete. Collect this product by filtering. Mix it up with water to form a thin paste and add it to a solution of about eighty parts of nitro-meta-phenylene-diamin in about thirty thousand parts of water. This solution should be at a temperature of about 45° centigrade. Stir the mixture for about twelve hours while maintaining this temperature. Then raise the temperature gradually to about 90°. Add soda till alkaline and precipitate while hot with common salt. Allow to cool, filter, press, and dry.

For the production of our new coloring-matter tolidin can be used as an equivalent for benzidin and nitro-meta-toluylene-diamin for nitro-meta-phenylene-diamin.

Our new coloring-matter is less soluble in water than the substantive dyes of similar shade heretofore used. If one part of practically pure dye be boiled up with one thousand parts water and the mixture filtered hot a distinct residue remains on the filter. The aqueous solution is orange-colored, and the color is not changed to any extent by caustic soda. Mineral acids give a precipitate when added to the solution. If a sample of cotton material dyed with our new coloring-matter be treated with nitro-diazo-benzene, a slight change of color to brown orange takes place.

Now what we claim is—

1. As a new article of manufacture the substantive orange coloring-matter which can be obtained from a diamido base, meta-phenylene-diamin-disulfoacid and a nitro-meta-diamin and which is comparatively slightly soluble in water and when treated with nitro-diazo-benzene after dyeing on cotton goods is slightly changed in color to brown orange, all substantially as hereinbefore described.

2. The process for the manufacture of new substantive orange coloring-matter by combining a herein-described tetrazo compound of a diphenyl base first with meta-phenylene-diamin disulfoacid and then combining the resulting intermediate compound with a herein-described nitro-meta-diamin all substantially as described.

In testimony whereof we have hereunto set our hands in the presence of two subscribing witnesses.

HEINRICH AUGUST BERNTHSEN.
    PAUL JULIUS.

Witnesses:
    BERNHARD C. HESSE,
    ADOLPH R. CUTTING, Jr.